N. H. SUREN.
SIGNALING SYSTEM FOR SPRINKLER SYSTEMS.
APPLICATION FILED APR. 24, 1915.

1,224,099.

Patented Apr. 24, 1917.
3 SHEETS—SHEET 1.

Witnesses:
H. B. Davis.
Clara L. Erickson.

Inventor:
Nathan H. Suren
by Soyr & Harriman
Atty.

N. H. SUREN.
SIGNALING SYSTEM FOR SPRINKLER SYSTEMS.
APPLICATION FILED APR. 24, 1915.
1,224,099.
Patented Apr. 24, 1917.
3 SHEETS—SHEET 2.
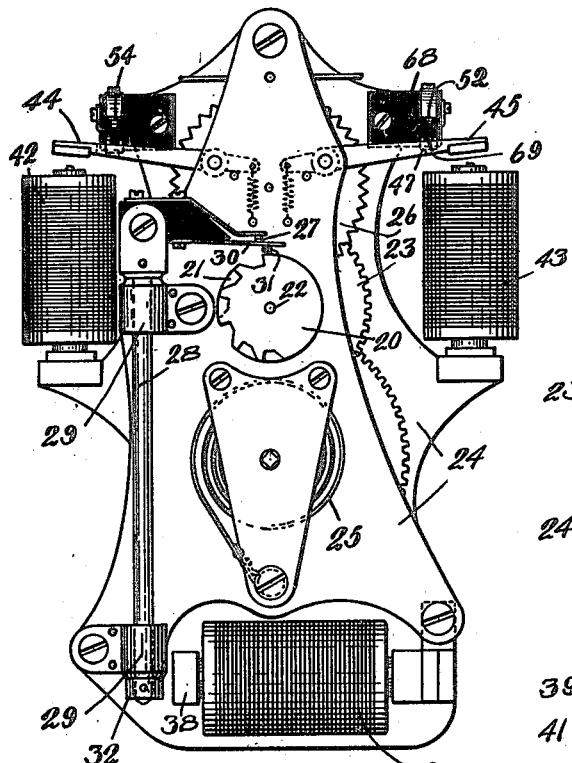
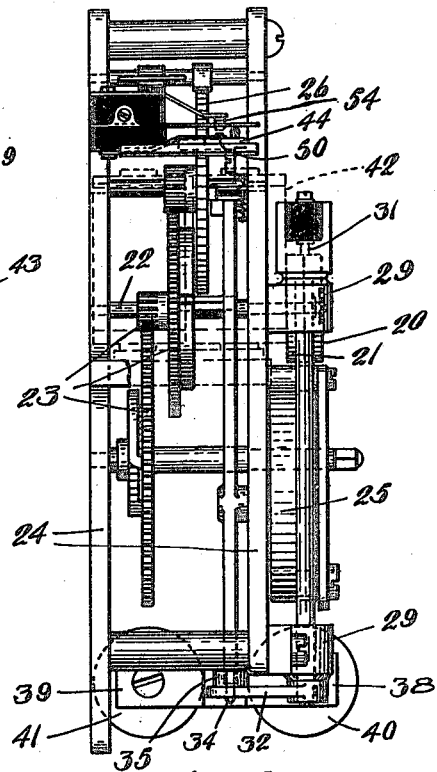
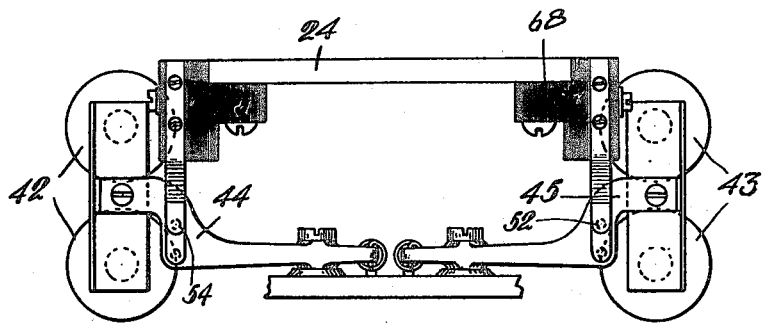
Witnesses:
H. B. Davis.
Clara L. Erickson.
Inventor:
Nathan H. Suren
by Noyes & Harriman
Attys.

N. H. SUREN.
SIGNALING SYSTEM FOR SPRINKLER SYSTEMS.
APPLICATION FILED APR. 24, 1915.
1,224,099.
Patented Apr. 24, 1917.
3 SHEETS—SHEET 3.
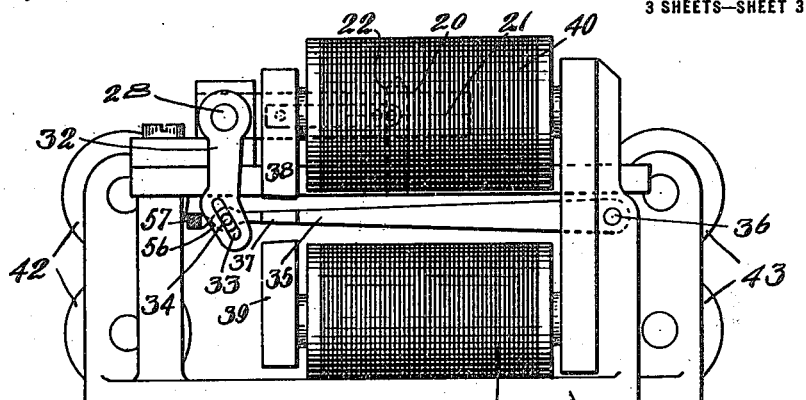
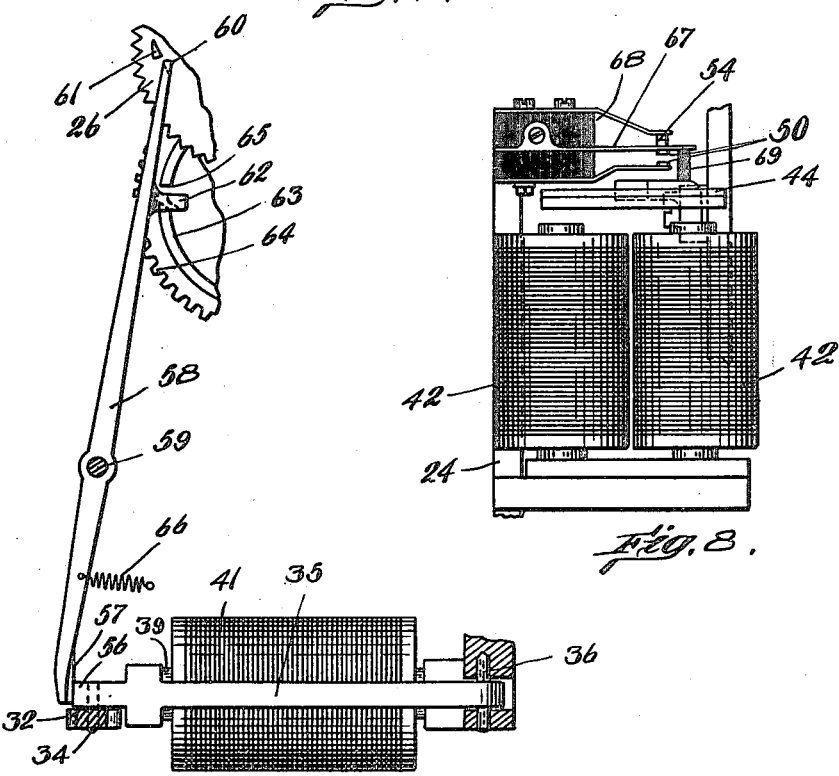
Witnesses:
H. B. Davis.
Clara L. Erickson.
Inventor,
Nathan H. Suren
By Noyes & Harriman
Attys.

UNITED STATES PATENT OFFICE.

NATHAN H. SUREN, OF NEEDHAM, MASSACHUSETTS, ASSIGNOR TO GAMEWELL FIRE ALARM TELEGRAPH COMPANY, OF NEW YORK, N. Y., A CORPORATION OF NEW YORK.

SIGNALING SYSTEM FOR SPRINKLER SYSTEMS.

1,224,099.  Specification of Letters Patent.  Patented Apr. 24, 1917.

Application filed April 24, 1915. Serial No. 23,777.

*To all whom it may concern:*

Be it known that I, NATHAN H. SUREN, a citizen of the United States, residing at Needham, in the county of Norfolk and State of Massachusetts, have invented an Improvement in Signaling Systems for Sprinkler Systems, of which the following is a specification.

This invention relates to signal apparatus of a type specially designed and adapted for use with sprinkler systems or like systems of water distribution. More especially the invention has to do with alarm-controlling mechanism adapted to transmit signals to indicate a flow of water and the hydrostatic condition of the system. One important object of the invention is to provide means adapted to transmit a code-signal or like distinctive signal to distinguish a plurality of different conditions in the water distributing system; such for example as one code-signal to indicate a flow of water or a subnormal pressure condition in the service-pipe, and another different code-signal to indicate a normal pressure condition in the system. A further object is to provide a code-signal transmitting system adapted to transmit distinctive signals to denote different conditions in the water distributing system, wherein likelihood of improper sounding of the alarm from a casual or momentary abnormal condition is avoided; so that the possibility of false alarms from a sudden rise or fluctuation in pressure as might be caused by the so-called water hammer effect is avoided, and also the possibility of a false alarm from a diminution of pressure resulting from an influence outside the system under control. A still further object is to provide improved signal-box mechanism having provision to be controlled by elements of the sprinkler-system, such as a check valve and a pressure gage, to transmit selective code-signals to indicate different conditions in the sprinkler-system. The foregoing and other objects and features of the invention will be better understood from the following detailed description taken in connection with the accompanying drawings and will be thereafter pointed out in the appended claims.

Referring to the drawings:

Fig. 4 is a front elevation of the signal box mechanism of my invention.

Fig. 5 is a partial side view thereof.

Fig. 6 is a partial plan view.

Fig. 7 is a bottom plan view.

Fig. 8 is a partial side elevation showing especially the coöperative arrangement of the contact springs with their controlling magnets, and Fig. 9 is a fragmentary view partly in section and partly in elevation showing the connections whereby the magnets control the signal train.

Figure 1:
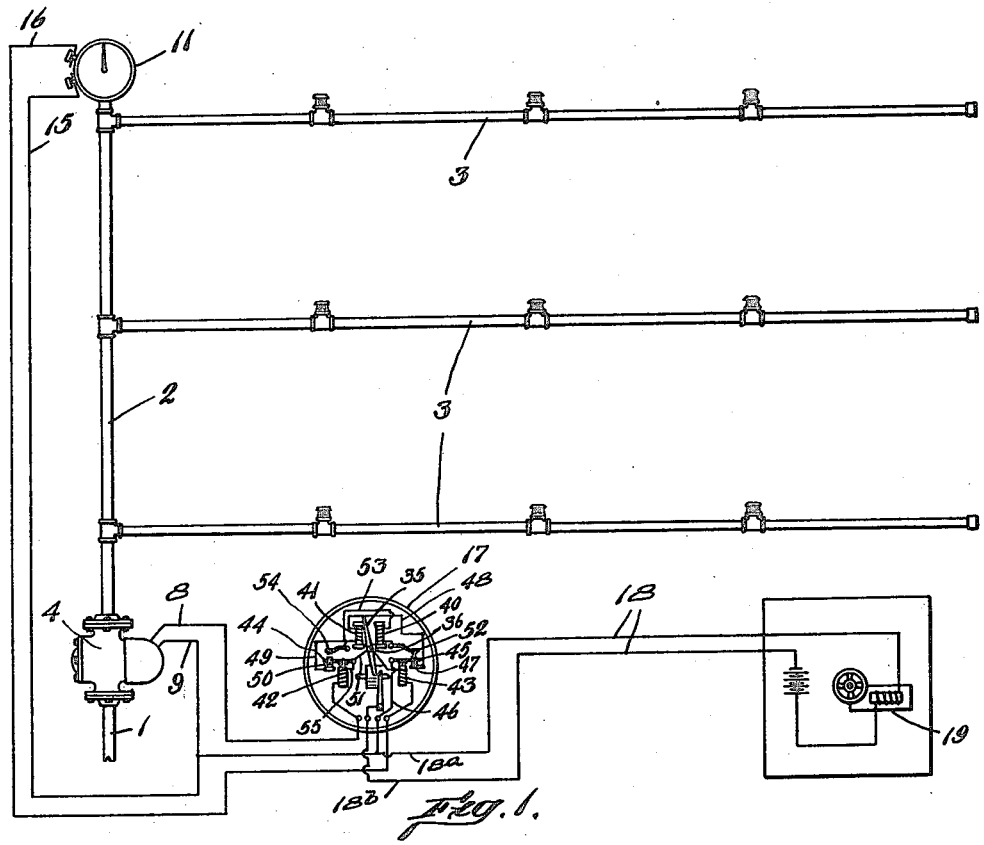
Figure 1 is a diagrammatic elevation showing a sprinkler system equipped with a signal mechanism in accordance with my invention.
Figure 2:
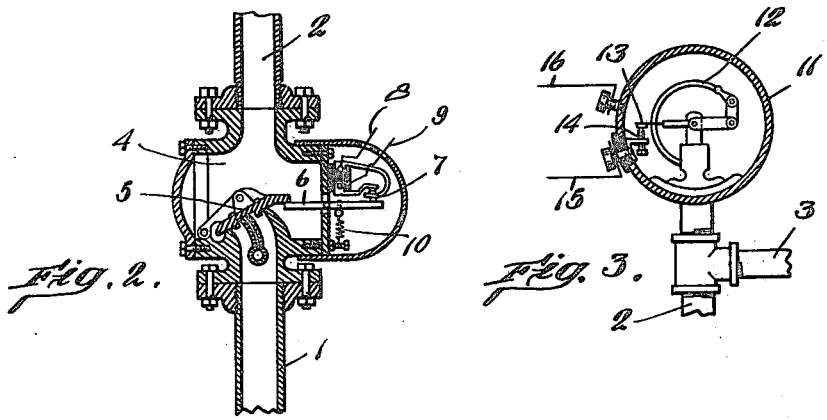
Fig. 2 is a sectional view of a check valve associated with the signal mechanism.
Figure 3:
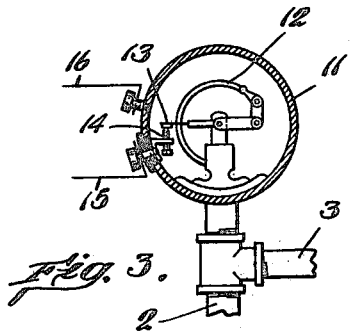
Fig. 3 is a sectional view of a pressure controlled element in the sprinkler system also associated with the signal mechanism.

The supply-pipe of the sprinkler-system is indicated at 1 and service-pipe at 2 from which branches 3 are extended to supply the sprinkler-heads as is usual. At the junction of the supply-pipe and service-pipe a check-valve device 4, is interposed, having a movable valve-plate 5 normally closing the passage but adapted to open under excess pressure from the supply-pipe 1 to permit flow of water into the service-pipe 2. This check-valve may, in practice, be of any suitable construction provided only it has a movable element, such as the valve-plate 5, to engage a pivoted lever 6 and hold it when the valve is closed in a predetermined position, *i. e.*, as shown in a position to close the contacts 7 of circuit-wires 8, 9, the lever being held by the valve-plate in this position against the action of a light contractile spring 10, which is adapted to swing the lever to separate said contacts as soon as the valve-plate moves to open communication between the supply and service pipes, as will be readily understood. The valve-plate 5, is often suddenly and momentarily opened by a rise in pressure in the supply-pipe due to a "water-hammer" resulting in the momentary separation of the contacts 7, which would sound a false-alarm were not corrective means employed as now to be described. For this purpose a pressure-operated element shown as a pressure-gage 11 is connected with the service-pipe. This pressure-gage may be of any well known or suitable construction, as shown, being of a type having an ordinary Bourbon spring 12 in open communication with the pressure; this spring having connected with it a contact-member 13 arranged for engagement with a coöperative contact-member 14, which is insulated from the shell or case of the gage and leads to one circuit-wire 15, while the other circuit-wire 16 is connected with the shell of the gage. The normal pressure contained in the service-pipe is sufficient to cause the spring 12 to be held so as to keep the contacts 13, 14 engaged so that the circuit through wires 15, 16 is normally closed. Upon a reduction of the pressure due to the flow of water from the service-pipe, the spring 12 is caused to separate the contacts 13, 14 and thereby open the circuit. It will be understood that the occurrence of momentary increased pressure, such as caused by a water-hammer will not affect the closure of the contacts 13, 14, except to press them more firmly together. The system, thus described, is substantially the same as in my application Serial #4,925, filed January 28, 1915, and in the present case, as in said application, both circuit-controllers are arranged to control the same circuit and only upon operation of both will the circuit be controlled. In accordance with my present invention this pressure-gage element, and the circuit-controlling device of check-valve 4 are coöperatively arranged to control a signal-box mechanism, designated generally at 17, by which signals are transmitted through a circuit 18, to a receiving-station having a suitable register or recorder 19.

The signal-box mechanism 17, is provided with signal-wheels 20, 21, each formed to transmit a distinctive code-signal, fixed side by side on a shaft 22, operatively engaged by a train 23, which may be of any usual or suitable type, mounted in a frame-work 24, with an actuating-spring 25 and an escapement-wheel 26. Selective code-signals are transmitted by the signal-wheel 20 or 21 over the circuit 18 and the recorder 19 by controller-contacts 27, arranged in said circuit. These contacts are swingingly mounted on an upright shaft 28, journaled in spaced apart bearings 29, on the frame-work and capable of oscillating to permit a downward projection 31 on a spring-arm 30, controlling the contacts 27, to engage either the signal-wheel 20 or the signal-wheel 21, according to one of two limiting positions that it occupies, as presently explained. For oscillating the shaft 28 to cause the contacts 27 to be operated by the proper one of the signal-wheels 20, or 21, it has fixed thereto a crank-arm 32, having an oblique slot 33, engaged by a pin 34 on an armature-lever 35, fulcrumed at 36, and having an armature 37 mounted between, and in the field of, the pole-pieces 38, 39 of magnets 40, 41, respectively. Thus, as the magnet 40 is energized, the shifting of the armature-lever 35, toward it, will throw the contacts 27 into operative engagement with the signal-wheel 21, and when this magnet is deënergized and the magnet 41 is energized, the contacts 27 will be moved into operative engagement with the signal-wheel 20. The signal-box mechanism is also provided with magnets 42, 43 having armatures carried by armature-levers 44, 45, respectively, and these armature-levers act as circuit-controlling members, as now to be explained. For this purpose the lever 45 has a connection 46, from the side 18ᵃ of the circuit 18, and when its armature is attracted by the magnet 43, it closes a contact-connection 47 to a conductor 48 leading to the magnet 41, the circuit from this magnet continuing through a conductor 49, through lower contacts 50 to the armature-lever 44 of magnet 42, and thence through a connection 51 to the fulcrum 36 of armature-lever 35 with an insulated connection through the signal-contacts 27, back to the battery through the return wire 18ᵇ. When the armature 45 is retracted, connection is made from the branch 46, to the upper contacts 52, controlled by said lever to the magnet 40, thence through a lead 53 to the upper contacts 54, controlled by armature-lever 44, and through said armature back to the return wire 18ᵇ, through the connection 51, and the signal-contacts, as before described. The magnet 42, is connected at one terminal with the wire 8, and at its other terminal by a connection 55, with the fulcrum 36, and signal-contacts to the return wire 18ᵇ, the other wire 9 from the check-valve 4, being connected with the line 18ᵃ. The magnet 43 is connected at one terminal with the line 16, from the pressure-gage 11, and its other terminal leads to the return connection 18ᵇ.

It may now be understood that with the system ready for use and before the water is turned into the pipes, or with the system filled with water at sub-normal pressure, the contacts 7 of the check-valve will be closed while the pressure-gage contact 13 will be open. With this condition the magnet 42, will be energized and its armature-lever 44, attracted while the magnet 43 will be deënergized and the armature-lever 45 retracted. Thus, at this time, no current will pass through either of the magnets 40 or 41, the circuit of magnet 40, being broken by the open contacts 54, and the circuit of magnet 41, being broken by the open contacts 45, 47. As soon as water is turned into the system the check-valve clapper 5, will be lifted, opening the contacts 7, thus deënergizing magnet 42, permitting armature-lever 44 to retract, closing the contacts 54. A circuit is now established from branch 18ᵃ, conductor 46, armature-lever 45, contacts 52, through magnet 40, conductor 53, contacts 54, armature-lever 44, through the pivot-point 36, and the contacts 26, back through line 18ᵇ to the battery; being thus energized the magnet 40 attracts armature 37, swinging its lever 35, oscillating the shaft 28 and shifting the contacts 27 into operative engagement with the signal-wheel 20. Means is provided whereby this movement trips the signaling-mechanism, thus sending a code-signal which will be identified as a water-flow signal. For tripping the signaling-mechanism to release this signal, the armature-lever 35, has a projection 56, at its end engaging a coöperative tapered projection 57, at the end of a lever 58, fulcrumed to the frame-work at 59, and having at its upper end a lateral lug 60, normally engaged with a lateral stop-lug 61, on the escapement-wheel 26. As will be seen in Fig. 9, the engagement of the projection 56 with the projection 57, upon the described shifting of the armature-lever 35, will cause the lug 60 to be moved out of engagement with the lug 61, permitting the train to start. The lever 58, is also equipped with a projection 62, adapted to coöperate with a circular flange 63, formed on another wheel 64 of the train, and having a recess 65 through which the projection 62 may operate, this rim being arranged to hold the lever 58 with the projection 60 drawn inward out of the way of the lug 61 until the wheel 64 has completed a revolution when a retractile spring 66 draws the projection 62 out through the recess 65, so that the projection 60 is in position to engage the lug 61 the next time it comes around to stop the train.

As soon as the service-pipe and branches are filled so that the pressure rises to normal, the pressure-gage contacts 13, 14 are closed, and as the water stops flowing the check-valve clapper also closes the contacts 7. Thereupon both of the magnets 42, 43 will be energized and attract their respective armatures 44, 45, whereupon a new circuit is established from branch 18ᵃ through conductor 46, lower contacts 47 of the lever 45, and conductor 48, through magnet 41, conductor 49, and lower contacts 50 of armature lever 44, thence through the connection 51 to the signal-contacts and return-wire 18ᵇ. The magnet 40, being now de-energized and the magnet 41 energized, the armature 37 is drawn toward the pole-piece 39 causing oscillation of the shaft 28, to shift the signal-contacts 27, into operative relation with the signal-wheel 20, thus causing transmission of a signal indicating normal-condition of the water distribution system.

In the subsequent normal operation of the apparatus, the signal mechanism will only be rendered active by the operation and control of both the circuit-controllers in the water distribution system, i. e., the check-valve 5 and the pressure gage 11. Thus assuming the valve 5 to be lifted as would be the case momentarily with a water hammer, though the contacts 7 would be broken, de-energizing the magnet 42 and closing the contacts 54, no current would then pass through either of the magnets 40, 41 as the contacts 52 would be open, the magnet 43 being energized as the contacts 13, 14 are closed, the pressure acting on the pressure gage 11 being normal. Likewise should the contacts 13, 14 be opened owing to a diminution of pressure from any cause or in any way so that a water-flow past the valve 5 did not result, the water-flow signal would not be given, because though the retraction of armature 45 would close the contacts 52, since the armature 44 would still be held attracted by the magnet 42, the circuit-controller contacts 7 remaining closed, the contacts 54 would be open and there would hence be no energization of the magnet 40. On the other hand, whenever by reason of drawing off of water from the service-pipe 2, as from the sprinkler heads, the circuit-controller check-valve 5 is lifted, and the circuit-controller pressure-gage 11 also operated to open its contacts, the circuit is completed through the magnet 40, causing the water-flow signal to be transmitted, as already described, while as soon as the pressure is again restored to normal, by the coöperative control of the circuit-controller check-valve 5, and the circuit-controller pressure-gage 11, the magnet 41 is energized to transmit the normal-pressure signal.

It will be understood that these operations will be repeated each time any considerable flow of water passes the check-valve 4, holding its clapper 5 lifted, to transmit the water-flow signal, and then when the pressure in the service-pipe reaches normal, to transmit the normal-pressure signal. It will be understood that when the clapper of the check-valve is momentarily lifted, as would be the case on the occurrences of a water-hammer effect, though a little more water would be forced into the service-pipe, slightly increasing the pressure therein, no signal will be given. While I have heretofore for simplicity of description referred to the armature-levers 44, 45, as carrying the current and directly engaging the upper and lower contacts controlled thereby, I may provide a separate current bearing and intermediate movable circuit-closing member, as indicated at 67 in Fig. 8, this being mounted on an insulating-block 68, and acted on by an insulating finger 69 projecting up from the armature-lever, this member 67 being shown as formed to have a spring tendency downward to complete the circuit through the lower contact, but being pressed upward by the finger 69, as the armature-lever is retracted to break the lower contact and to complete the circuit through the upper contacts. I do not desire to be limited to structural details herein shown and hence refer to the appended claims rather than to the foregoing description to indicate the scope of the invention.

I claim:—

1. The combination with a water distribution system having a supply-pipe and a service-pipe, a check-valve interposed therebetween, and a pressure-gage connected to said service-pipe, of signal-mechanism having governing circuits connected to be controlled, one by said check-valve and another by said pressure-gage, to cause selective code-signals to be transmitted.

2. The combination with a sprinkler-system having a supply-pipe and a service-pipe, a check-valve interposed between said pipes, and a pressure-gage associated with the service-pipe, of a signal-mechanism having governing circuits controlled by said check-valve and said pressure-gage, respectively, electro-magnetic devices energized by said circuits, and means controlled thereby for transmitting selective code-signals according to the condition of said sprinkler-system.

3. The combination with a sprinkler-system having a supply-pipe and a service-pipe with a check-valve interposed therebetween, and a pressure-gage associated with the service-pipe, of signal-mechanism having governing circuits arranged to be controlled by said check-valve and said pressure-gage, respectively, said signal-mechanism having electro-magnets responsive to each of said circuits, and means controlled by said electro-magnets for transmitting selective code-signals.

4. The combination with a sprinkler-system having a supply-pipe and a service-pipe, with a check-valve interposed therebetween, and a pressure-gage associated with the service-pipe, of signal-mechanism having governing-circuits arranged to be controlled by said check-valve and said pressure-gage, respectively, said signal-mechanism having electro-magnets responsive to each of said circuits, and having connections to exert a governing action on the other of said circuits, and means controlled by said electromagnets for transmitting selective code-signals.

5. The combination with a sprinkler-system having a supply-pipe and a service-pipe, with a check-valve interposed therebetween, and a pressure-gage associated with the service-pipe, of signal-mechanism having governing-circuits arranged to be controlled by said check-valve and said pressure-gage, respectively, said signal-mechanism having a signal-train equipped with a plurality of signal-wheels, and means responsive to said circuits for causing any one of said signal-wheels to become operative.

6. The combination with a sprinkler-system having a supply-pipe and a service-pipe, with a check-valve interposed therebetween, and a pressure-gage associated with the service-pipe, of signal mechanism having governing circuits arranged to be controlled by said check-valve and said pressure-gage, respectively, said signal mechanism having a signal-train equipped with a plurality of signal-wheels, and spaced-apart electro-magnets governed by said circuits and having a common armature in the fields of both said magnets and shiftable therebetween, said armature having the contact-controller of a signal-circuit to be controlled by said signal-wheels, operatively connected therewith, to be shifted thereby from one signal-wheel to another.

7. The combination of a signal-circuit having a recorder therein, signal-mechanism for controlling said circuit having a plurality of signal-wheels, with a contact-controller shiftable for engagement by any one of said wheels, spaced-apart electro-magnets having an armature shiftable therebetween and in the fields of both thereof, other electro-magnets having connections for energizing one or the other of the first named magnets, selectively, a water-distribution system having elements therein responsive to water-flow and to pressure-variation, and governing circuits arranged to be controlled by said elements and to govern the condition of the last-named electro-magnets, whereby selective code-signals are transmitted to indicate the condition of said system.

8. Apparatus of the kind described, comprising a water distribution system, a plurality of devices associated therewith responsive to different conditions in said system and each having a circuit controller operated thereby, and code-signal transmitting mechanism arranged to transmit different code-signals to indicate different conditions in said system responsively connected to said circuit controllers, said signal transmitting mechanism including means coöperatively arranged with said circuit-controllers whereby an alarm will be transmitted only upon operation of both circuit-controllers.

9. Apparatus of the kind described, comprising a water distribution system, a device associated therewith responsive to a flow of water, a device associated therewith responsive to static pressure conditions in said system, circuit-controllers associated with each of said devices, and code-signal transmitting mechanism formed to transmit selective code-signals, one indicating a water-flow and another a normal pressure condition in said system, said signal-transmitting mechanism responsively connected to said circuit-controllers and arranged to be rendered active only by the coöperative action of both circuit-controllers.

10. In an alarm-controlling means for sprinkler-systems, the combination with a supply-pipe and service-pipe of a sprinkler-system, of a check-valve arranged to open and close communication between the supply-pipe and service-pipe, a pressure-gage connected with the service-pipe, circuit-controllers associated, respectively, with said check-valve and pressure-gage, and code-signal transmitting mechanism having provision for transmitting selective code-signals to indicate one a waterflow in said system, and another, normal pressure in said system, said mechanism responsively connected to said circuit-controllers and arranged to be rendered active only by the operation of both circuit-controllers.

11. Apparatus of the kind described, comprising a water distribution system, a plurality of separate devices associated therewith each responsive to a different condition in said system, and signal-mechanism responsively connected to said devices arranged to become active only by the coactive operation of said devices, said signal-mechanism and said devices having coöperative provision for transmitting selective code-signals to indicate different conditions in said system.

12. Apparatus of the kind described, comprising a water distribution system, a plurality of separate devices associated therewith each responsive to a different condition in said system, and each having a circuit-controller arranged to be operated thereby, and signal-mechanism responsively connected to said circuit-controllers and arranged to be operated coöperatively thereby only, said signal-mechanism and said devices with their circuit-controllers having coöperative provision to transmit one code-signal to indicate a water-flow in said system and another code-signal to indicate normal pressure in said system.

13. Apparatus of the kind described, comprising a water distribution system, a plurality of devices associated therewith responsive to different conditions in said system, each of said devices having a circuit-controller arranged for operation thereby, and code-signal transmitting mechanism responsively connected to said circuit-controllers, and arranged to be rendered active only by a circuit controlling actuation of each thereof, said signal-transmitting mechanism and said devices with their circuit-controllers having coöperative provision to transmit one code-signal to indicate a waterflow in said system, and another code-signal to indicate normal pressure in said system.

14. The combination of a fluid conduit, of a pressure-responsive signaling-apparatus including a signaling-mechanism, an electric circuit, pressure-responsive circuit-controllers interposed in the conduit and connected in the circuit, and electrically operable means for rendering the circuit-controllers inactive as to changes in character of the circuit with respect to the signal, except when the controllers simultaneously respond to corresponding fluostatic changes in the conduit.

15. The combination of a fluid conduit, of a pressure-signaling-apparatus including a signaling-mechanism, an electric circuit controlling the mechanism, pressure-responsive circuit-controllers connected in the circuit and interposed in the conduit, and a complemental electrically operable means controlled independently by the circuit-controllers for preventing either of said controllers from independently effecting in the circuit a change to which the signal-mechanism will respond.

16. The combination with a fluid conduit, of a pressure-responsive signaling-apparatus including a signaling-mechanism, an electric circuit controlling the mechanism, pressure-responsive circuit-controllers connected in the circuit and interposed in the conduit, and complemental electrically operable means interposed in the circuit and controlled independently by the circuit-controllers, said means being operable for effecting in the circuit a change to which the signaling-mechanism will respond only upon the concurrent response of the circuit-controllers to corresponding fluostatic changes.

17. The combination with a fluid conduit, of a pressure-responsive signaling-apparatus including a signaling-mechanism, an electric circuit controlling mechanism, pressure-responsive circuit-controllers connected in the circuit and interposed in the conduit, and complemental electrically operable means interposed in the circuit and controlled independently by the circuit-controllers, said means being operable for effecting in the circuit a change to which the signaling-mechanism will respond only upon the concurrent response of the circuit-controllers to corresponding fluostatic changes, and means associated with said last-mentioned means and controlled thereby for effecting the production by the signal of a selective signal which will indicate the nature of the fluostatic means to which the controllers have concurrently responded.

In testimony whereof, I have signed my name to this specification, in the presence of two subscribing witnesses.

NATHAN H. SUREN.

Witnesses:
E. P. WALDRON,
C. C. BISSETT.